United States Patent [19]
Sharp et al.

[11] 3,725,995
[45] Apr. 10, 1973

[54] MOULDING PLASTIC ARTICLES

[75] Inventors: Herbert John Sharp, Greenford; Victor William Stanley Humphrey, Radlett, both of England

[73] Assignees: GKN Sankey Limited, Bilston, Staffordshire; Aro Plastic Building Supplies Limited, London, both of England

[22] Filed: May 3, 1971

[21] Appl. No.: 139,379

[30] Foreign Application Priority Data

May 5, 1970 Great Britain.....................21,522/70

[52] U.S. Cl. .....................29/407, 29/458, 29/482, 29/526, 29/527.1, 264/155, 264/278, 52/309
[51] Int. Cl. .............................................B23q 17/00
[58] Field of Search......................29/458, 407, 526, 29/482, 527.1; 264/155, 277, 278; 52/309, 656, 725

[56] References Cited

UNITED STATES PATENTS

| | | | |
|---|---|---|---|
| 1,808,047 | 6/1931 | Littleton et al. | 264/278 X |
| 2,192,183 | 3/1940 | Deutsch | 264/278 |
| 2,387,013 | 10/1945 | Fuller | 264/155 UX |
| 3,420,929 | 1/1969 | Morin | 264/278 |
| 3,470,598 | 10/1969 | Berthelsen | 52/309 X |

FOREIGN PATENTS OR APPLICATIONS 462,615 3/1937 Great Britian......................264/155

Primary Examiner—Charlie T. Moon
Attorney—Merriam, Marshall, Shapiro & Klose

[57] ABSTRACT

The specification discloses a method of making an aperture-defining frame member e.g. a window frame, comprising a rigid, frame-shaped reinforcement embedded in synthetic resinuous material. The method comprises placing the reinforcement in a mould cavity having the shape of the required frame member, at least partly locating the reinforcement in the cavity by engaging the reinforcement between a plurality of pairs of pin-like projections, the projections of each pair extending from the cavity walls in opposite directions and being located directly opposite to one another, filling the mould cavity with synthetic resinuous material to embed the reinforcement therein while the reinforcement is located in the cavity by the projections, subsequently opening the cavity and withdrawing the projections from the completed frame member after moulding of the member is complete thus to leave bores in the material at the positions occupied by the projections during moulding, providing an aperture through the reinforcement in alignment with the bores left by at least one pair of projections and fixing a bushing to extend through said bores and said aperture, the bushing being in sealing engagement with said bores. The bushing may be used to receive a fastener to secure the frame member to another member and the bushing may be in two parts, a first part having a hollow shank with a collar at one end thereof and a second part arranged to engage the end of the shank remote from the collar.

5 Claims, 12 Drawing Figures

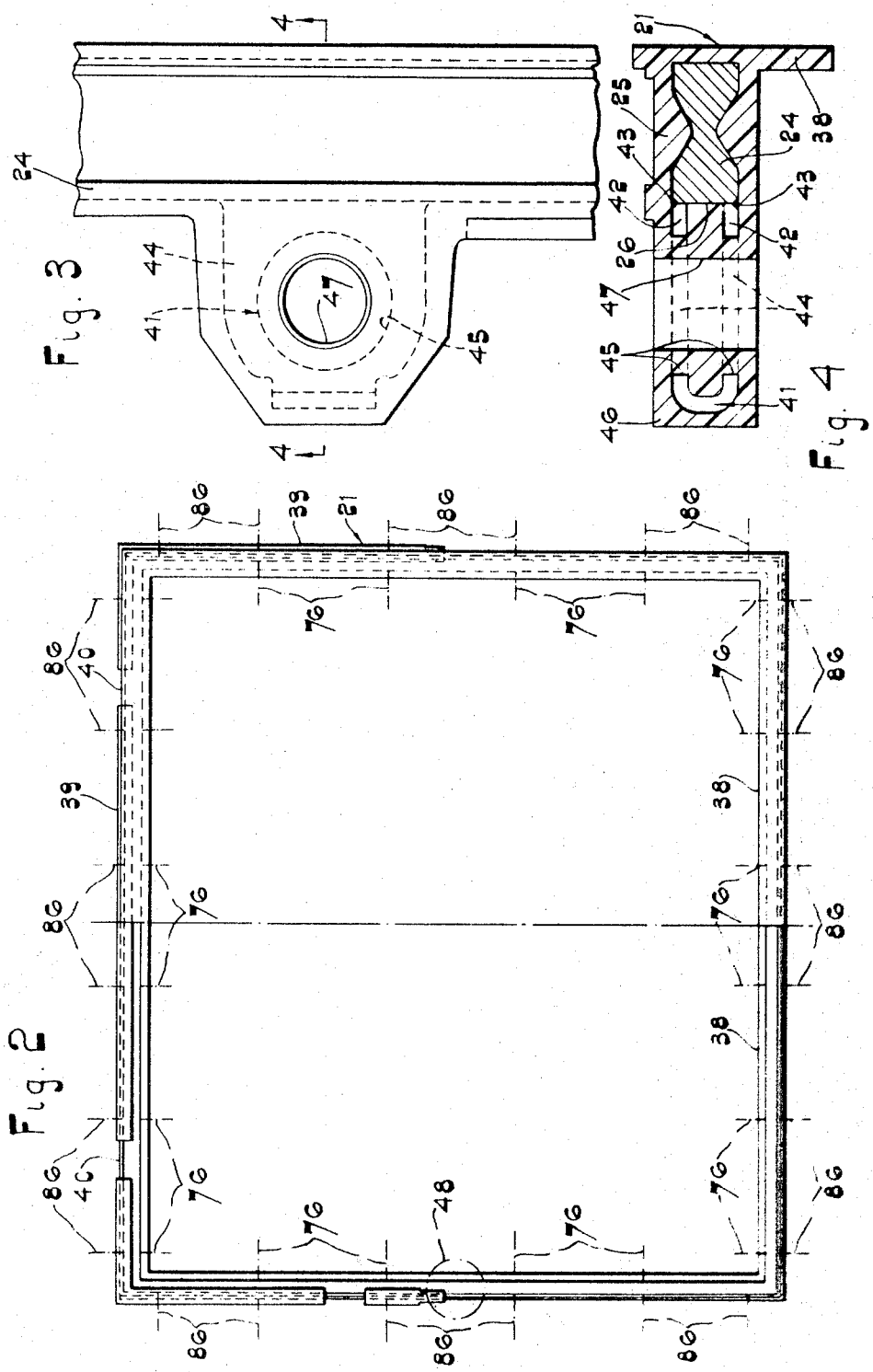

3,725,995

MOULDING PLASTIC ARTICLES

BACKGROUND OF THE INVENTION

FIELD OF THE INVENTION

This invention relates to a method of making an aperture-defining frame member comprising a rigid, frame-shaped reinforcement embedded in synthetic resinous material, i.e. plastics material, and to such a frame member.

The invention has been developed in connection with the manufacture of window frames and in particular the type of window frame including an outer frame to be secured to a building and an inner frame pivotally or otherwise movably mounted on the outer frame. In such window frames the outer and inner frames will normally be rectangular. The invention is not limited to the production of such window frames and can be applied to the manufacture of aperture-defining frame members in general. Such frame members may be endless, e.g. rectangular or polygonal, or may be open frame members such as, for example, a door frame which comprises two parallel members with a third member which joins the one ends of the two members while the other ends of the two parallel members are unjoined. The term "aperture-defining frame members" is used herein to include both open and closed frame members.

SUMMARY OF THE INVENTION

The object of the invention is to provide a method of making an aperture-defining frame member of the construction described above in which bushings are provided in the frame member whereby the latter can easily be fixed to another member to form an assembly. In the case of a window frame, for example, the bushings may be provided to enable the window frame to be secured easily to a supporting structure by passing fastening members through the bushings into the supporting structure.

The invention has a further advantage in that the reinforcement can be held in the mould cavity during the whole of the moulding step rather than being withdrawn part way through the moulding step as has heretofore been proposed. If the reinforcement is held in the mould cavity by projections, when these projections are withdrawn, bores are left in the covering of the plastics material into which the bushings can be inserted thus providing a convenient location for the bushings and also sealing of the bushings to the covering protects the reinforcement from attack if, as is often the case, the reinforcement is of a metal which is subject to atmospheric attack. This is particularly important in connection with window frames which are of course exposed to the atmosphere.

According to one aspect of the invention we provide a method of making an aperture-defining frame member comprising a rigid, frame-shaped reinforcement embedded in synthetic resinous material, the method comprising placing the reinforcement in a mould cavity having the shape of the required frame member, at least partly locating the reinforcement in the cavity by engaging the reinforcement between a plurality of pairs of pin-like projections, the projections of each pair extending from the cavity walls in opposite directions and being located directly opposite to one another, filling the mould cavity with synthetic resinous material to embed the reinforcement therein while the reinforcement is located in the cavity by the projections, subsequently opening the cavity and withdrawing the projections from the completed frame member after moulding of the member is complete thus to leave bores in the material at the positions occupied by the projections during moulding, providing an aperture through the reinforcement in alignment with the bores left by at 'east one pair of projections and fixing a bushing to extend through said bores and said aperture, the bushing being in sealing engagement with said bores.

Preferably, the bushing is in two parts, a first part having a hollow shank with a collar at one end thereof and a second part arranged to engage the end of the shank remote from the collar, the method comprising inserting the first part into one bore of an aligned pair of bores so that the shank passes through the aperture, sealing the collar in the first bore, and inserting the second part into the other bore of said aligned pair of bores and sealing said second part to the other bore and to the other end of the shank.

The bushing or the parts thereof may be adhered in the bores or may be made of synthetic resinous material and welded in the bores by solvent, friction or ultrasonic welding. If it is not desired to place bushings in all of the aligned pairs of bores such bores may be closed by plugs of synthetic resinous material which close the bores and protect the reinforcement.

According to another aspect of the invention there is provided an aperture-defining frame member comprising a rigid frame-shaped reinforcement embedded in a covering of synthetic resinous material, said member having at least one bushing extending therethrough, the or each bushing having end portions in sealing engagement with bores in said covering and passing through an aperture in the reinforcement in alignment with said bores.

Preferably, the reinforcement has oppositely directed grooves therein with diverging side walls and when a two-part bushing is used as described above the collar and the second part of the bushing have conical surfaces which engage with said side walls.

The invention also includes an aperture-defining frame member fastened to another member to form an assembly by fasteners passing through the bushings.

BRIEF DESCRIPTION OF THE DRAWING

The invention will now be described in detail by way of example with reference to the manufacture of a window frame comprising inner and outer frame parts each comprising a rigid frame-shaped reinforcement embedded in synthetic resinous material. In the accompanying drawings:

FIG. 2 is an elevation similar to FIG. 1 showing the inner frame of the window, the left hand part of FIG. 2 being an elevation in the direction of the arrow A in FIG. 5 and the right hand part of FIG. 2 being an elevation in the direction of arrow B in FIG. 5;

FIG. 3 is a side elevation of a hinge detail applicable to the frames of FIGS. 1 and 2;

FIG. 4 is a section on the line 4—4 of FIG. 3;

DESCRIPTION OF THE PREFERRED EMBODIMENT

Figure 5:
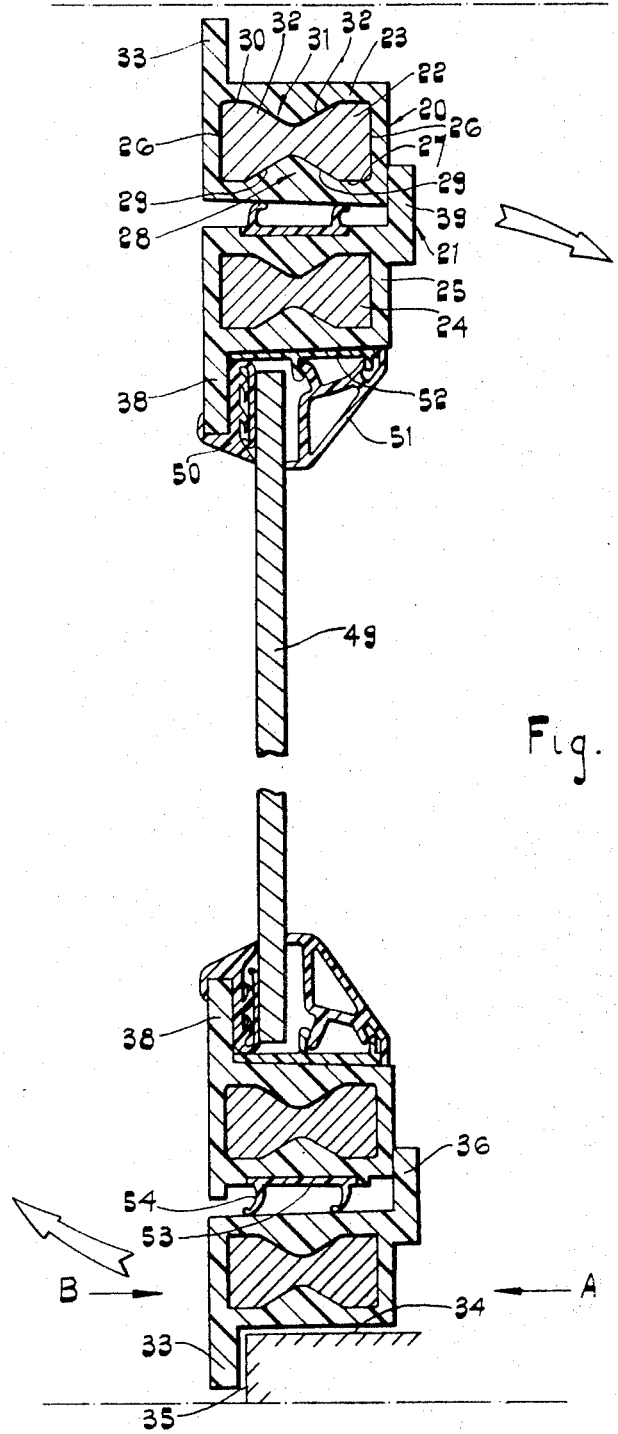
FIG. 5 is a vertical section through a complete window embodying the outer and inner frames of FIGS. 1 and 2.

Referring now to FIGS. 1 to 5, the window frame thereshown comprises an outer frame 20 and an inner frame 21, each frame being generally rectangular and comprising a rectangular metal reinforcement embedded in a covering of synthetic resinous, i.e. plastics material. In FIG. 5 the reinforcement for the outer frame 20 is indicated at 22 and the covering at 23. The reinforcement for the inner frame 21 is indicated at 24 and the covering at 25. Each reinforcement 22 and 24 is in the form of a rectangular frame formed of solid metal sections which are mitred at their ends and are welded together. The shape of the section is similar for each frame and comprises, referring to the reinforcement 22, parallel straight sides 26, and an inner side 27 having a groove 28 therein with diverging side walls 29 and an outer side 30 having a groove 31 therein with diverging side walls 32. The material of the reinforcement frame is preferably mild steel and the frame members can be cut off from a solid drawn section, their ends mitred and welded together.

The coverings 23 and 25 are formed with flanges as required.

Figure 1:
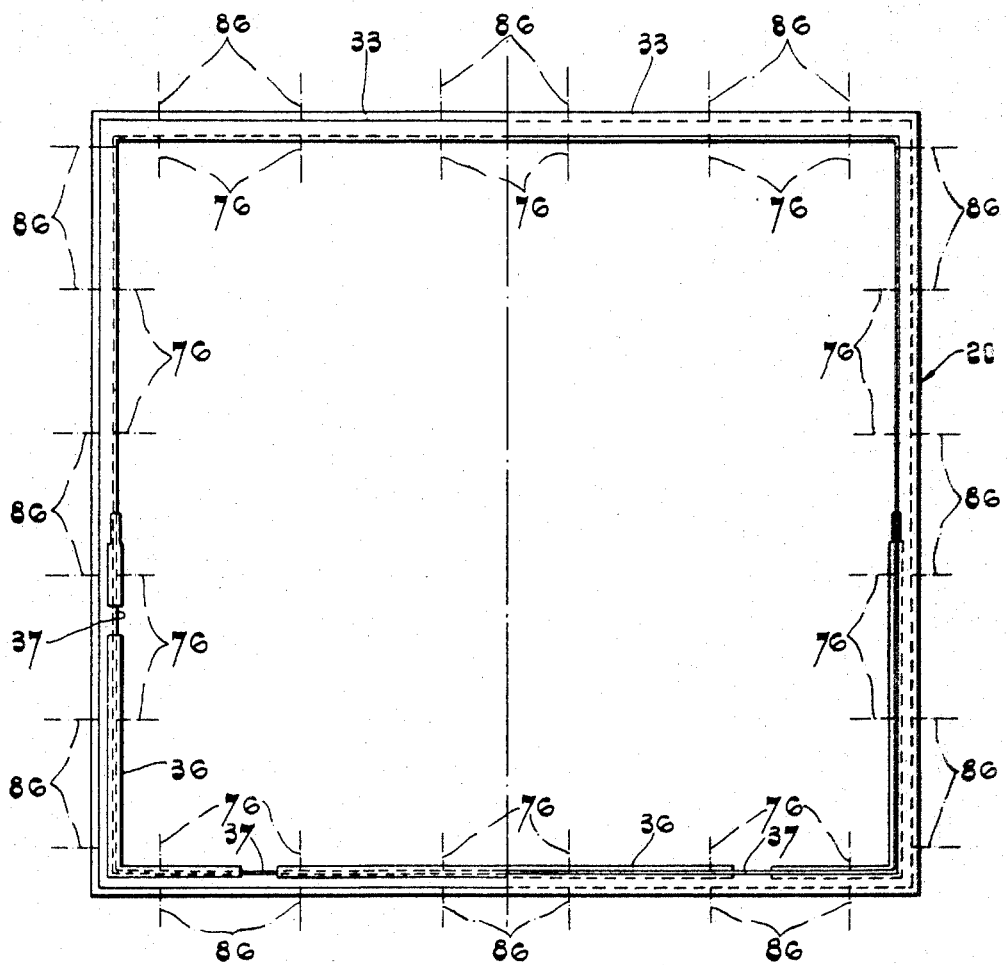
FIG. 1 is an elevation of an outer window frame member, the left hand part of FIG. 1 being an elevation in the direction of the arrow A in FIG. 5 and the right hand part of FIG. 1 being an elevation in the direction of the arrow B in FIG. 5.

Thus referring to FIGS. 1 and 5, the outer frame 20 is provided with a continuous, outwardly directed, peripheral flange 33 which is arranged to overlap the edge of an aperture 34 in a supporting wall 35. The lower half of the frame is provided with an inner flange 36 which is inwardly directed as is clear from FIGS. 1 and 5 and which has discontinuities 37 to receive stays or fastener for the window and which are not shown.

The inner frame 21, referring to FIGS. 2 and 5, has a continuous, inwardly directed flange 38 on its outer surface as shown in FIG. 5 and over the upper part of a frame it has on its inner surface an inwardly directed flange 39 provided with discontinuities 40 for window stays and fasteners, not shown.

FIGS. 3 and 4 show a detail of a hinge means which are provided on the frames 20 and 21 whereby the frames may be hinged together. FIGS. 3 and 4 actually show part of the inner frame 21 and referring to these figures, a U-shaped metal strap 41 has its free ends 42 welded at 43 to one side 26 of the reinforcement 24 so that the limbs 44 of the strap are generally perpendicular to the side 26. The limbs 44 are provided with aligned apertures 45 and the strap is embedded in a part 46 of the covering 25. Received in the apertures 45 is a metal bushing 47 which is held in position by the plastics material of the part 45. The location of the hinge arrangement is indicated by the circle 48 in FIG. 2 and a similar hinge arrangement is provided on the outer frame 20 so that pivot pins may be passed through the aligned bushes such as 47 in the hinge parts thus to hinge the frame members together. In FIG. 5, the frame members are hinged about a horizontal axis. The part 46 of the covering is produced simultaneously with the main part of the covering 25 as will be described below.

Referring to FIG. 5, the window is completed by a pane of glass 49 received in the inner frame 21 and held therein by a peripheral seal 50, peripheral beading 51 and a peripheral extrusion 52 secured to the inner frame and which locate the seal 50 and the beading 51. The outer periphery of the inner frame 20 also carries, in a groove 53 a seal 54 to seal with the inner periphery of the outer frame.

The manufacture of the frames will now be described in relation to FIGS. 6 to 9.

Figure 6:
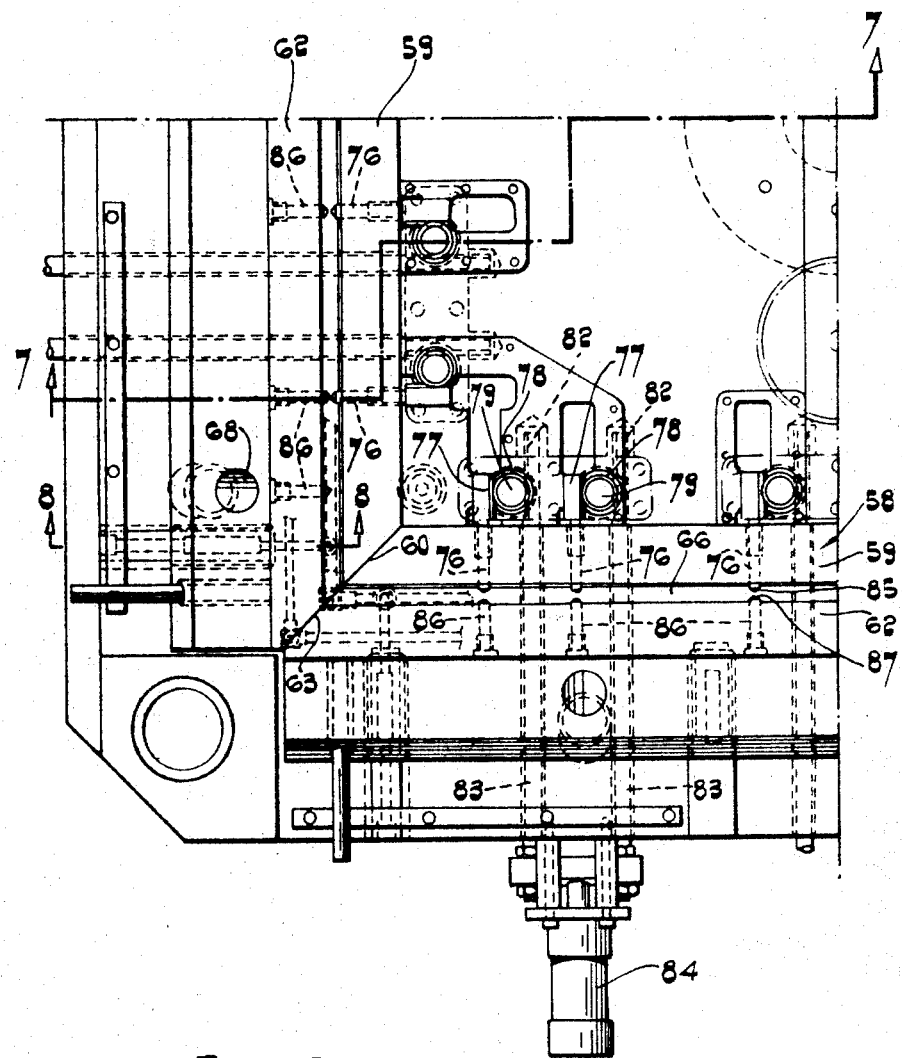
FIG. 6 is a partial plan view of apparatus embodying the invention for producing a frame member embodying the invention.
Figure 7:
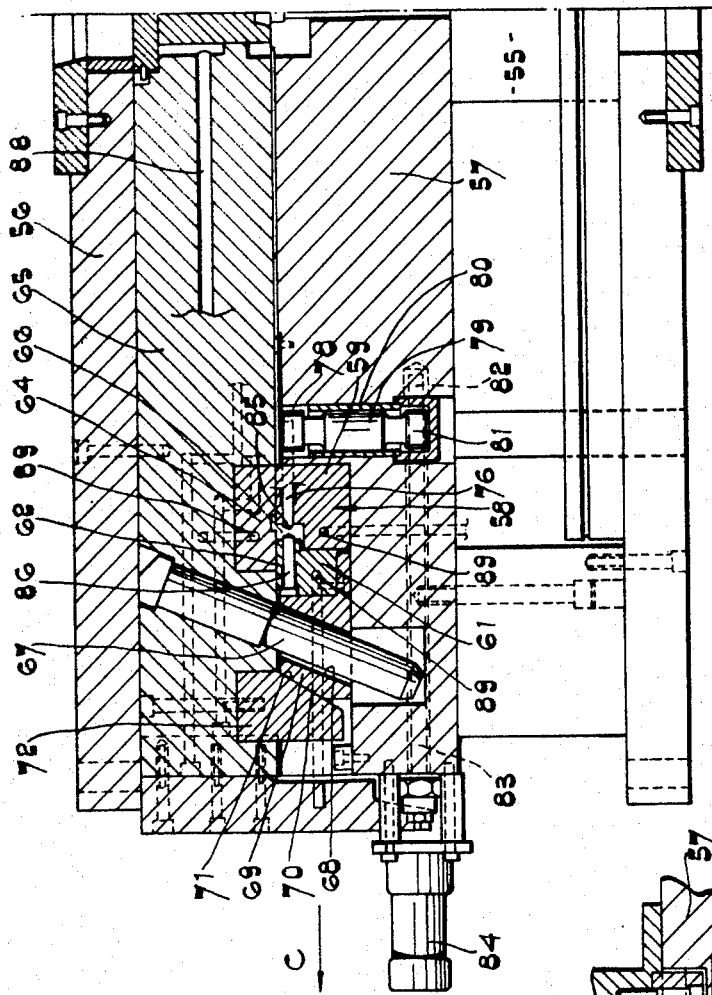
FIG. 7 is a section on the line 7—7 of FIG. 6.

Referring first to FIGS 6 and 7 the apparatus there shown comprises a lower platen 55 and an upper platen 56. The lower platen 55 carries a base member 57 which in turn carries an inner, mould-cavity-forming member 58. The member 58 is rectangular and is made up of four elements, two of which are shown at 59 in FIG. 6, the elements meeting at a mitred corner 60.

The mould cavity is further defined by an outer mould-cavity-forming assembly 61 which comprises four members two of which are indicated at 62 in FIG. 6 and which are independently movable towards and away from the elements 59. When the elements 62 are in their inner positions they are as shown in FIGS. 6 and 7 and meet at a mitred corner 63.

The mould cavity is completed by a closing member 64 which is carried by the upper platen 56 through an upper support 65. The inner member 58, the outer assembly 61 and the closing member 64 together define, when the mould is closed, a mould cavity indicated at 66. This mould cavity is in the present case in the form of an endless channel of rectangular shape in plan view but it will be appreciated that the shape of the cavity would depend on the shape of the frame member to be made.

The upper support 65 carries a number of pins, one of which is indicated at 67 which are inclined to the vertical and each of which is received in a bore 68 in an outer support 69 to which a member 62 is secured. When the upper platen 56 is moved upwardly in FIG. 7 the engagement of the pins 67 in their bores 68 results in the outer support 69 moving outwardly as in the direction of the arrow C in FIG. 7 and thus moving outwardly the members 62 of the assembly 61. As will be described this opens the mould cavity and allows the frame member to be removed and the closing member 64 is also moved upwardly with the upward movement of the upper platen 56. Each outer support has an inclined surface 70 which engages when the mould is closed with an inclined surface 71 on a wedging member 72 carried by the upper support 65 so that when the mould is closed the outer supports 69 are held against outward movement by engagement of the inclined surfaces.

Figure 8:
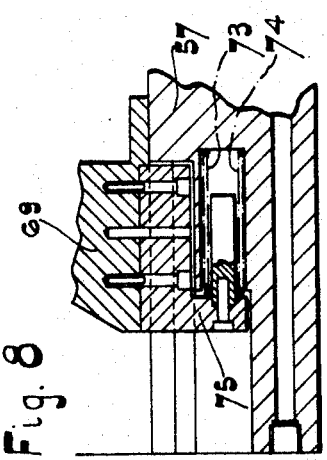
FIG. 8 is a detailed section on the line 8—8 of FIG. 6.

To facilitate outward movement of the outer supports with their members 62 a spring arrangement is provided as shown in FIG. 8. Thus a plurality of springs, one of which is shown at 73 are located in bores such as 74 in the base member 57. Each spring 73 acts on a flange 75 of the outer support 69 tending to force the latter outwardly.

The reinforcement such as 22 or 24 is held in the mould cavity 66 by pin like projections mounted on the inner elements 59 and the outer members 62. Referring first to the inner members 59, the projections are indicated in FIGS. 6 and 7 at 76. Each projection is formed at its inner end with a toothed rack 77 which engages with a pinion 78. The pinion 78 is formed at the upper end of a shaft 79 shown in FIG. 7 mounted in a bearing sleeve 80 in the base member 57. The lower end of the shaft 79 is formed with a pinion 81 which is engaged by a toothed rack 82 formed at the end of a rod 83 operated by a pneumatic or hydraulic jack 84. As will be seen from FIG. 6, there are two rods 83 associated with each jack 84 and operated thereby, these two rods operating two shafts 79 to operate two adjacent projections 76. All the projections 76 are operated in a similar manner as will be apparent from FIGS. 6 and 7, the free end of each projection being indicated at 85.

The outer members 62 also carry projections indicated at 86 and having conical ends 87. It will be seen from FIGS. 6 and 7 that each projection 86 is directly opposite to a projection 76 and the projections 76 and 86 extend in opposite directions from the walls of the mould cavity. Thus the projections are arranged in pairs, each pair comprising a projection 76 and a projection 86 and the projections 76 belong to one set and the projections 86 to another set.

The mould assembly is provided with conventional means for introducing synthetic resinous material into the cavity, such means being indicated generally at 88 and cooling water passages 89 are provided in the various mould parts.

The manufacture of a frame member will now be described in general terms. A reinforcement such as 22 or 24 is first manufactured by cutting to the desired length a solid drawn section of the shape referred to above and mitring and welding the ends of the length to form a reinforcing frame. The mould shown in FIGS. 6, 7 and 8 is opened by raising the upper platen 56 which raises the closing member 64 and moves outwardly the outer members 61 by engagement of the pins 67 in the bores 68 and the action of the springs 74 as described above. The projections 76 are retracted wholly into the elements 59 by operation of the pneumatic or hydraulic jacks 84 acting through the rods 83, the rack and pinions 82 and 81, the shafts 79, the pinions 78 and the racks 77. The reinforcing frame is then placed in the cavity and the pneumatic jacks 84 are operated to project the projections 76 into the cavity so that the conical ends 85 thereof engage in the groove 28 in the inner wall of the reinforcement and the conical end closely engages the diverging side wall 29. The mould is then closed by lowering the upper platen 56 which has the effect of moving inwardly the outer members 62 via the pins 67 and the bores 68 and against the action of the springs 74 and clamping said outer members in their inner positions through engagement of the inclined surfaces 70 and 71. Simultaneously, the closing member 64 of the cavity comes into engagement with the inner and outer members thus to close the cavity. As the outer members 62 move inwardly the projections 86 engage the reinforcement and the conical ends 87 of the projections engage in the groove 31 in the outer walls of reinforcement, the conical surfaces at the ends of the projections closely engaging the diverging walls 32 of the groove 31.

The reinforcement is thus located against movement in vertical directions in FIG. 7 by engagement of the conical ends 85 and 87 of the projections 76 and 86 in the grooves 28 and 31. The reinforcement is located against movement horizontally in FIG. 7 by the arrangement of the projections around the reinforcement and in FIGS. 1 and 2 the center lines of the projections are indicated to illustrate how the reinforcement is held against horizontal movement.

Plastics material is now forced into the die cavity and completely embeds the reinforcement. It also embeds the hinge strap 41 referred to above. When the moulding is completed and the plastic material is solid, the pneumatic jacks 84 are operated to retract the projections 76 and the cavity is opened by raising the upper platen 56 which moves the outer members 62 outwardly and thus disengages the projections 86 from the frame member and the latter can then be moved from the die cavity and a further moulding operation carried out with a fresh reinforcement.

Figure 9:
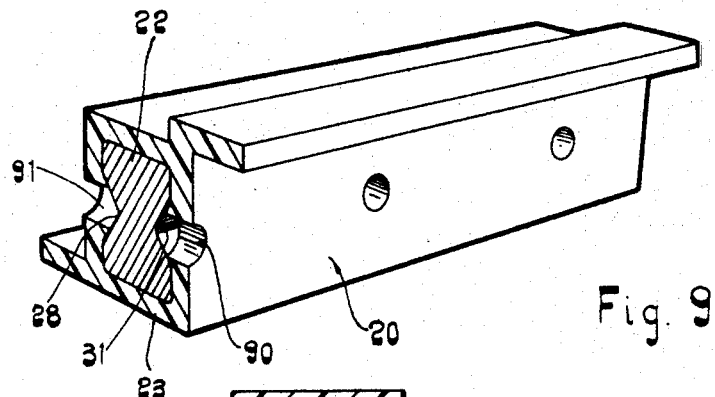
FIG. 9 is a perspective view of part of a window frame as it leaves the mould.

Referring now to FIG. 9, this shows part of a frame member as it leaves the mould after retraction of the projections 76 and 86. Assuming that FIG. 9 shows part of an outer frame member it will be seen that the covering 23 has pairs of aligned bores therein, one pair of bores being indicated at 90 and 91. It will be seen that these bores are generally cylindrical and terminate at their inner ends at the bottoms of the grooves 31 and 28 respectively. It will be appreciated that for each pair of projections 76 and 86 there will be a corresponding pair of bores 90 and 91.

Figure 10:
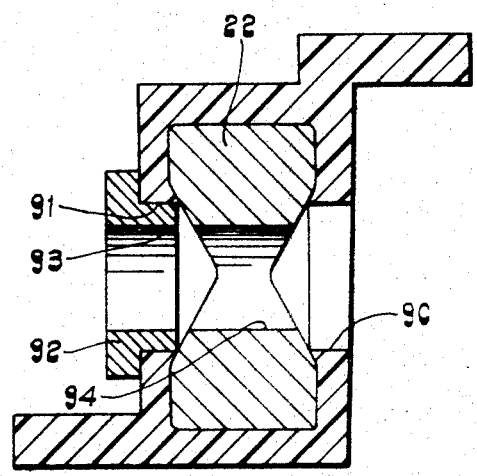
FIG. 10 is a section through the frame of FIG. 1 showing the use of a guide bush to drill the reinforcement.

Referring now to FIG. 10, this shows a pilot bush 92 received within the bore 91. The pilot bush has a bore 93 of lesser diameter than the bore 91 and the bore 93 provides guidance for a drill, now shown, whereby an aperture 94 can be drilled through the reinforcement 22 in alignment with the bores 90 and 91. Obviously the diameter of the aperture 94 will be less than the diameter of the bores 90 and 91.

Figure 11:
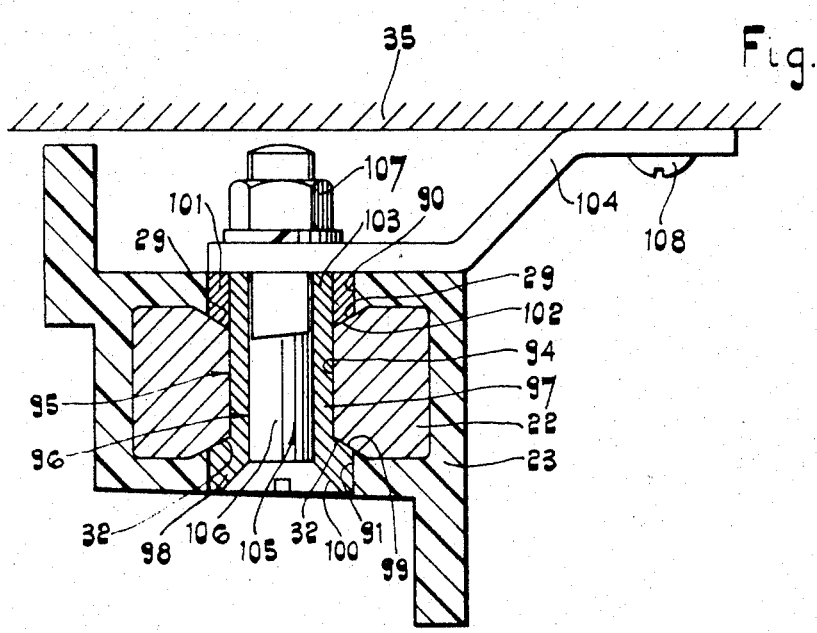
FIG. 11 is a section through a completed window frame embodying the invention showing a bush in position and a fastener passing through the bush securing the frame member to a bracket.

Referring now to FIG. 11, this shows a bushing indicated generally at 95 received in the bores 90, 91 and the aperture 94.

The bushing comprises two parts. A first part indicated generally at 96 and having a hollow shank 97 which is a close fit in the aperture 94. At one end of the shank 97 there is provided a collar 98 which is a close fit in the bore 91 and has conical surfaces 99 and 100, the former surface engaging the diverging side walls 32 of the groove 31 and the latter providing a countersunk aperture for receiving a head of a fastener as will hereinafter be described.

The second part of the bushing in indicated at 101 and is a close fit in the bore 90 and has a conical surface 102 which engages the diverging side walls 29 of the groove 28. The second part 101 is in the form of a ring and received within the part 101 is the end portion 103 of the shank 97 remote from the collar 98.

The collar 98 is sealed in the bore 91 and the second part 101 is sealed in the bore 90 and is also sealed to the portion 103 of the shank 97. It follows from the foregoing that the reinforcement 22 is completely sealed and protected by its covering 23 and the bushing 95.

The bushing may be sealed in the bores 90 and 91 in any convenient manner. Thus it may be adhered in the bores and the part 101 may be adhered to the portion 103. Alternatively, the bushing if made of synthetic resinous material may be welded in the bores by any convenient form of welding e.g. solvent welding, friction welding, or ultra-sonic welding.

FIG. 11 shows how the frame member is connected to a bracket 104 by means of a fastener 105 comprising a nut and bolt the bolt 106 being received in the shank 97 and passing through an aperture in the bracket and being secured thereto by a nut 107. As shown, in FIG. 11 the outer part of the window frame is secured to the supporting wall 35 by the bracket 104 which is secured to said wall by a screw 108.

It will be appreciated that bushings such as 95 will be inserted into as many pairs of aligned bores such as 90 and 91 as are required to fix the frame member to another member such as a supporting wall 35. It will be appreciated, however, that the other member to which the frame member is connected could be a further frame member or any other member not merely a wall. The provision of the bushing protects the reinforcement against attack while at the same time providing a very convenient bore for the fastener 105.

Figure 12:
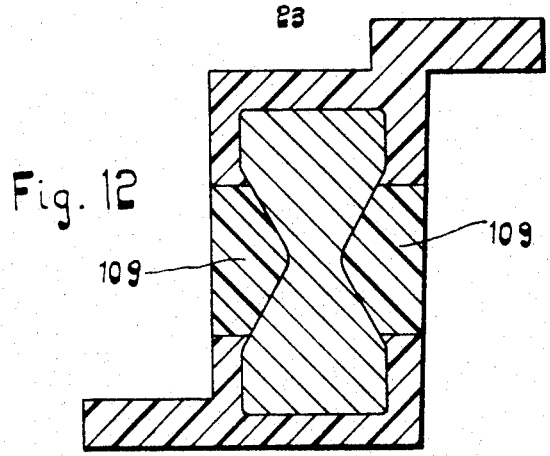
FIG. 12 is a section through a frame member embodying the invention showing plugs received in a pair of aligned bores.

It may be that in some frame members it is not required to put a bushing in each aligned pair of bores such 90 and 91 and in such case the bores may be filled with plugs of synthetic resinous material such as indicated in FIG. 12. The plugs are indicated at 109 and are received in the bores and are secured in sealing engagement therewith either by being adhered by the bores or by being welded therein as described above in relation to the parts of the bushing. It is apparent that where plugs such as 109 are being used it is unnecessary to drill the reinforcement to provide an aperture such as 94.

It will be seen that the invention provides a convenient and simple method of making an aperture defining frame member with bushings therein whereby the member can be fixed to another member. The invention has been described in detail in connection with a closed frame member i.e. a window frame but the invention can be applied to an open frame member as described at the beginning of this specification.

We claim:

1. A method of making an aperture-defining frame member comprising a rigid, frame-shaped reinforcement embedded in synthetic resinous material, the method comprising placing the reinforcement in a mould cavity having the shape of the required frame member, at least partly locating the reinforcement in the cavity by engaging the reinforcement between a plurality of pairs of pin-like projections, the projections of each pair extending from the cavity walls in opposite directions and being located directly opposite to one another, filling the mould cavity with synthetic resinous material to embed the reinforcement therein while the reinforcement is located in the cavity by the projections, subsequently opening the cavity and withdrawing the projections from the completed frame member after moulding of the member is complete thus to leave bores in the material at the positions occupied by the projections during moulding, providing an aperture through the reinforcement in alignment with the bores left by at least one pair of projections and fixing a bushing to extend through said bores and said aperture, the bushing being in sealing engagement with said bores.

2. A method according to claim 1 wherein the bushing is in two parts, a first part having a hollow shank with a collar at one end thereof and a second part arranged to engage the end of the shank remote from the collar, the method comprising inserting the first part into one bore of an aligned pair of bores so that the shank passes through the aperture, sealing the collar in said first bore, and inserting the second part into the other bore of said aligned pair of bores and sealing said second part to said other bore and to the other end of the shank.

3. A method according to claim 1 including adhering the bushing in said bores.

4. A method according to claim 1 wherein said bushing is made of synthetic resinous material and including welding said bushing in position in said bores.

5. A method according to claim 1 including inserting in the bores left by at least one pair of projections plugs of synthetic resinous material and sealing said plugs in said bores.

* * * * *